United States Patent [19]

Ripoll

[11] 4,407,770

[45] Oct. 4, 1983

[54] CABLE ANCHORAGE

[75] Inventor: Luis Ripoll, Barcelona, Spain

[73] Assignee: Stronghold International AG, Vaduz, Liechtenstein

[21] Appl. No.: 359,832

[22] Filed: Mar. 19, 1982

[30] Foreign Application Priority Data

Mar. 25, 1981 [GB] United Kingdom ................. 8109308

[51] Int. Cl.³ ........................ B29C 25/00; B29D 3/02; B28B 21/60
[52] U.S. Cl. ..................................... 264/69; 264/228; 264/229; 264/261
[58] Field of Search ..................... 264/69, 73, 74, 229, 264/231, 267, 272.19, 272.11, 102, 262, 228, 261; 425/111

[56] References Cited

U.S. PATENT DOCUMENTS

| | | | |
|---|---|---|---|
| 2,378,252 | 6/1945 | Staehle et al. | 264/69 |
| 2,618,815 | 11/1952 | Iezzi | 264/74 |
| 2,941,905 | 6/1960 | Hofman | 264/69 |
| 2,948,930 | 8/1960 | Herbst | 264/272.19 |
| 2,950,576 | 8/1960 | Rubenstein | 52/223 R |
| 3,150,032 | 9/1964 | Rubenstein | 52/223 R |
| 3,383,446 | 5/1968 | Brennecke | 264/272.11 |
| 3,787,544 | 1/1974 | Barnette | 264/69 |

FOREIGN PATENT DOCUMENTS

| | | | |
|---|---|---|---|
| 863679 | 3/1961 | United Kingdom | 264/272.19 |
| 1042972 | 9/1966 | United Kingdom | 52/230 |

Primary Examiner—Willard E. Hoag
Attorney, Agent, or Firm—Cushman, Darby & Cushman

[57] ABSTRACT

A method of filling a sleeve 4 of cable stay anchorage with a filling material comprising aggregate particles and a curable liquid mixture of an epoxy resin and a powder, comprising the steps of first filling the sleeve 4 with the curable liquid mixture (via pipe 10), secondly adding the aggregate particles (via pipe 11) and then allowing the liquid mixture to cure to form a solid mass containing the aggregate particles. The method of filling the anchorage is considerably easier than prior art methods, does not require the use of injection-pumps and provides a filling material with low shrinkage and good corrosion and friction preventing properties. The anchorage also has plastics locating members 7, 8 to hold the wires 1 out of contact with the sleeve wall, to prevent friction under cyclic loads.

10 Claims, 2 Drawing Figures

CABLE ANCHORAGE

BACKGROUND OF THE INVENTION

1. Field of the Invention

This invention relates to a method of filling a cable anchorage with a filling material and to cable anchorages formed by such a method.

The invention is especially applicable to the cable stays in a cable stayed structure where there is a particular need for an anchorage which can withstand cyclical loading, but is in principle applicable to other anchorages of other cables, e.g. prestressing cables. The cable may consist of a single cable element or a plurality of cable elements, each element being for example a wire or a strand (a strand is a multi-wire element). For simplicity we shall generally use the term "wire" in this description.

In the construction of certain types of structures such as roofs or bridges it is common to use cable stays which transmit forces from for example a slab or deck to a column. In the past such stays were manufactured using conventional cables which were anchored at both ends in dead heads each having a conical internal shape in which the wires or the strands spread apart and which were filled with a mixture of tin and other fusible metals at low temperatures. Modern advances in this technique have introduced the use of tendons made up of parallel wires or strands which are anchored in heads filled with a special mortar of which the binding element is an epoxy resin. At the same time the ends of the wires or strands are anchored adjacent the head in an anchor plate by wedges, button heads or by some other type of anchorage.

It is a considerable problem however to obtain a filling material (especially for large tendons where the volume of material required is large) which does not shrink and whose curing temperature is within limits which do not affect the steel of the wires. Such considerations have led to the use of mixtures of epoxy resin, mineral powder and aggregates, in which the quantity of mineral powder and aggregate is great enough to reduce shrinkage of the epoxy resin to a minimum and to prevent any undue rise in temperature during the curing of the epoxy resin. The powder may be of silex or zinc or some other metal and the aggregate may be any type of heavy stone or steel balls.

However such a filling material is very thick and viscous and presents a number of problems in use. In order to inject the filling material into the anchorage a powerful injection pump is required. Even when such an injection pump is used, the use of such a thick filling material renders it difficult for the filling material to penetrate all the small spaces between the wires in the anchorage, especially when the filling operation is conducted on site. It is possible to achieve a better filling of the anchorage in factory conditions, but this would necessitate transporting the tendon to the site in its completely assembled form.

SUMMARY OF THE INVENTION

The object of the present invention is to simplify the above described methods for making up the stays on the job site and yet provide a method by which the anchorage will be filled with the desired filling having a high proportion of aggregate which can practically eliminate shrinkage and also limit the curing temperature.

According to the present invention there is provided a method of filling a cable anchorage comprising a sleeve and a cable element or elements passcomprising the steps of at least partially filling said sleeve with a curable low-viscosity liquid, thereafter adding aggregate particles to said curable liquid within said anchorage thereby partially to displace said liquid and then, with the liquid and aggregate occupying the sleeve to the desired extent, effecting cure of said curable liquid to form a solid mass containing said aggregate particles and enveloping the cable element or elements.

In the present invention there is preferably used as the curable liquid, a mixture comprising an epoxy resin as the binding element and a proportion of a powder which is generally a flour of silex or zinc.

Such a mixture, without the aggregate, is fluid enough to be poured inside the cone of the anchorage by gravity without the need for injection pumps. The fluidity of the mixture guarantees that all the inner surfaces will be wetted and that all the spaces between the wires or strands are filled.

If vibration is applied to the anchorage or the anchor plate, the penetration of the mixture between the wires or strands will be improved since they also will vibrate and the resin will fill all the spaces. This result could not be obtained so well if a pre-mixed thick mortar were used.

The ratio of aggregate to curable mixture is predetermined and the volume of the anchorage to be filled is known. The anchorage can therefore be filled with the correct amount of curable mixture such that the desired amount of aggregate can subsequently be added so as to completely fill the anchorage with filling material of the desired composition.

The aggregate together with the epoxy resin and powder mixture on curing forms a very solid material which makes a good anchorage for the wire or strands. Furthermore if any of the anchor means securing the tendon elements in the anchor plate fails, the aggregate/epoxy compound will form a vault in the sleeve which resist the force transmitted by the tendon. The fact that the aggregate particles are each surrounded by epoxy resin powder mixture also serves to prevent corrosion and reduce friction resulting in anchorages which can resist the high cyclical loads imposed on them.

The method according to the present invention renders the construction of such anchorages on site considerably easier than in prior art methods and avoids the need for expensive machinery.

BRIEF DESCRIPTION OF THE DRAWINGS

A preferred embodiment of the present invention will now be described with reference to the accompanying drawing in which.

DESCRIPTION OF THE PREFERRED EMBODIMENT

Figure 1:
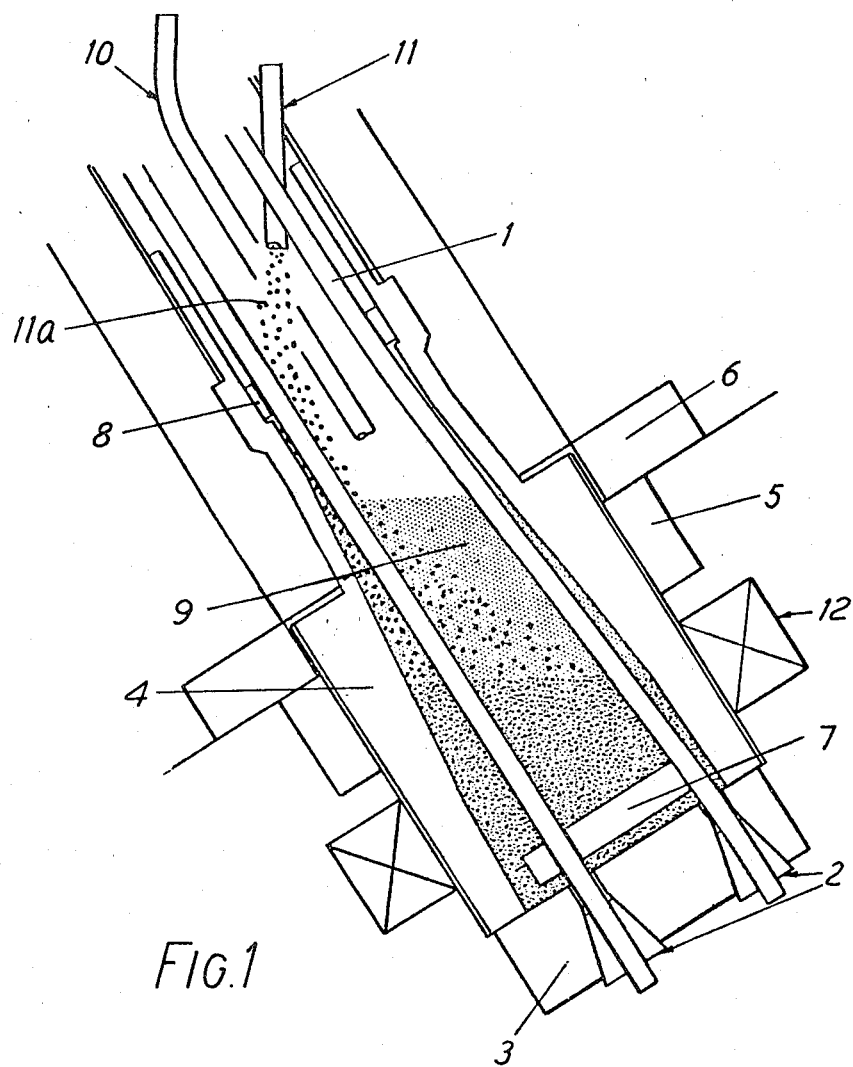
FIG. 1 is a vertical sectional view of the lower anchorage of a cable stay embodying the invention.

FIG. 1 shows a cable stay lower anchorage. The cable comprises wires or strands 1 which are secured by anchoring wedges 2 in an anchor plate 3 supported by a large partly conical sleeve called a dead head 4 which is located by an external nut 5 bearing on a bearing plate 6. A deflecting plate 7 of synthetic plastics material is located at the larger end of the dead head 4 adjacent the anchoring plate 3. The deflecting plate 7 has bores for the wires 1 which bores correspond in location to the parallel bores for the wires through the anchoring plate. Thus the deflecting plate 7 causes the wires to bend (in order to converge towards each other along the dead head). Bending at the anchoring plate 3, which might lead to friction under cyclic load or during tensioning of the wires, is avoided.

At the narrower part of the dead head 4, the wires 1 are encircled in the dead head by a further locating member in the form of a ring 8 also of synthetic plastics material, at which the wires 1 deflect from the mutually parallel position they occupy outside the dead head. The two locating member 7,8 thus ensure that the wires do not touch the internal wall of the dead head 4 which would lead to friction under cyclical loads and consequent possibility of a breakage.

The members 7,8 are made of suitable material softer than the steel of the wires 1. The ring 8 particularly may wear under cyclic load, but the wires will continue to be held in position away from the wall of the dead head by the epoxy resin mass now to be described.

The method of the present invention is in this embodiment performed, after the wires 1 are located in place, by first filling the dead head of the anchorage with a fluid epoxy resin/powder mixture 9 through a filling tube 10 to a predetermined level. The mixture is liquid enough to wet the inside surface of the anchorage and permeate all the crevices and gaps within the sleeve. The epoxy resin used may be of any suitable type and preferably is not corrosive. The powder may be any suitable powder and preferably a flour of silex or zinc or some other metal. The ratio of epoxy to powder used may be any suitable ratio and is for example 1 kg of epoxy to between 2 to 4, preferably 2 to 3 kg of powder. After the liquid epoxy resin/powder mixture is in place a predetermined amount of an aggregate 11a is introduced into the liquid mixture via a second filling tube 11. The amounts of liquid mixture and aggregate used are such as to fill the anchorage to the required level with filling material of the required composition. The aggregate used can be any suitable aggregate which is denser than the epoxy/powder mixture. Preferably the aggregate consists of spherical steel balls in order to increase the ease with which the aggregate sinks to the bottom of the anchorage. Spherical steel balls as used for shot blasting of surfaces have been found particularly suitable.

In order to facilitate the dense packing of the aggregate within the anchorage, the anchorage and its contents can be vibrated using a vibrator 12. Thus when added to the epoxy resin/powder mixture the aggregate will sink through the epoxy and form a densely packed array of epoxy resin/powder coated aggregate particles. As the aggregate particles comprise a large part of the volume of the filling material subsequent shrinkage will be minimal once the epoxy resin/powder mixture has cured and the resulting mass will also give good protection against corrosion and friction.

Figure 2:
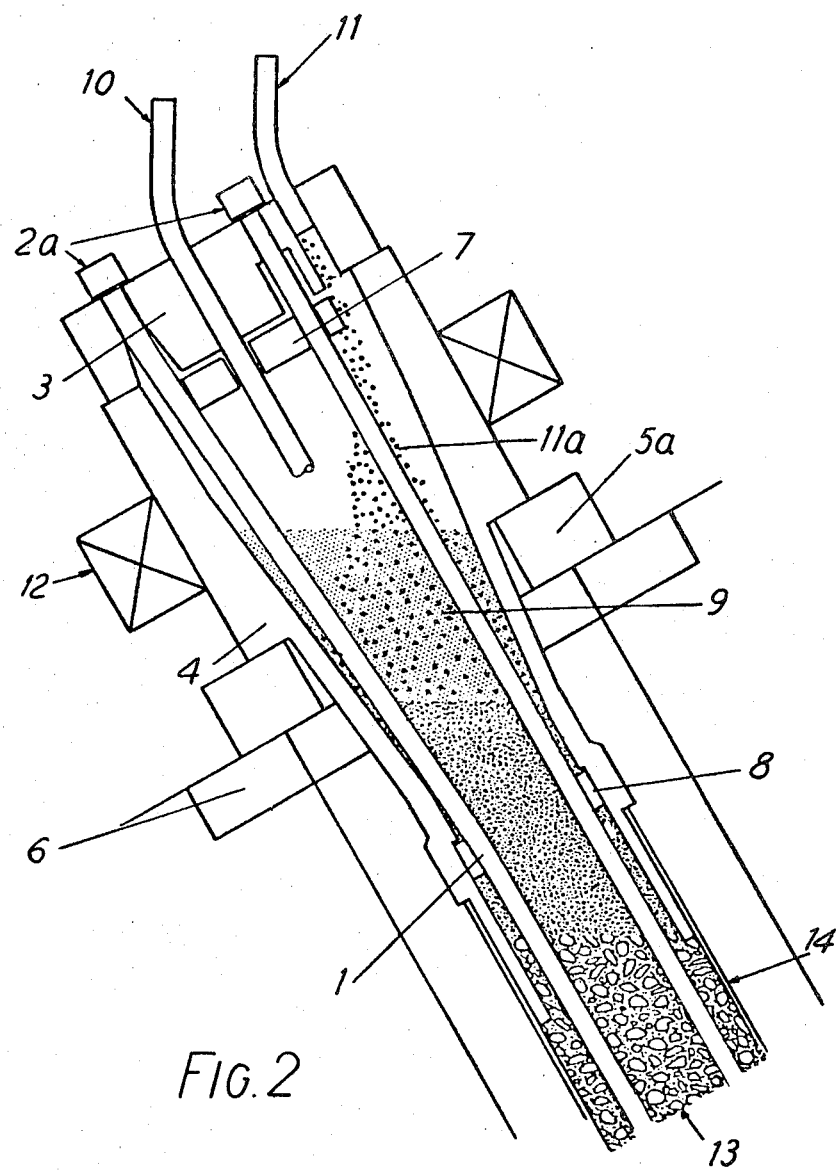
FIG. 2 is a vertical sectional view of the upper anchorage of the cable stay of FIG. 1.

FIG. 2 shows the upper anchorage. Parts corresponding to the parts of the lower anchorage of FIG. 1 are given the same reference numbers and need not be described again.

In this case, the dead head is supported by a shim 5a on the bearing plate 6 and the wires 1 are anchored by button heads 2a in the anchoring plate 3. The method of filling of the anchorage sleeve 4 is exactly as described for FIG. 1 except that in this case the liquid mixture of epoxy and powder is held in the sleeve by the cement grout 13 within the plastic sleeve 14 surrounding the cable outside the anchorages. The mixture and the aggregate are introduced via the tubes 10 and 11 which pass through the anchoring plate 3.

What is claimed is:

1. In a method of filling a cable anchorage comprising an anchored cable element or elements and a sleeve through which the cable element or elements extend the improvement comprising the steps of at least partially filling said sleeve with a curable low-viscosity liquid, thereafter adding aggregate particles to said curable liquid within said sleeve thereby to displace said liquid so that the liquid and the aggregate particles occupy the sleeve to the desired extent, and then effecting cure of said curable liquid to form a solid mass containing said aggregate particles and enveloping the cable element or elements.

2. A method according to claim 1 wherein said cable comprises a plurality of cable elements which extend spaced apart from each other through said sleeve.

3. A method according to claim 1 wherein said curable low viscosity liquid comprises a curable epoxy resin and a powder.

4. A method according to claim 3 wherein the ratio of said powder to said epoxy resin is in the range of from 2 to 4 kg of powder to 1 kg of epoxy resin.

5. A method according to one of claims 3 and 4 wherein said powder comprises finely divided zinc or silex.

6. A method according to any one of claims 1,2 and 3 wherein said aggregate particles comprise steel balls.

7. A method according to any one of claims 1,2 and 3 wherein said sleeve is vibrated during and/or after addition of the aggregate particles and before curing of said liquid.

8. A method according to any one of claims 1,2 and 3, wherein said cable element or elements are anchored in an anchoring plate located at one end of said sleeve.

9. A method according to any one of claims 1,2 and 3 wherein said sleeve is a tapering sleeve.

10. A method of anchoring a tensioned cable comprising at least one cable element, said method comprising the steps of
    (a) anchoring said cable element in an anchoring member so that the element extends away from said anchoring member through a sleeve,
    (b) at least partially filling said sleeve with a flowable, curable liquid so that said liquid surrounds the said cable element,
    (c) adding to said liquid in said sleeve a mass of particles so that the liquid and the particles occupy the sleeve to the desired extent, and
    (d) curing said liquid so as to form a solid mass containing said particles and enveloping the said cable element.

* * * * *